Patented Mar. 3, 1925.

1,528,639

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ALUMINOUS ABRASIVE MATERIAL AND METHOD OF MAKING THE SAME.

No Drawing.   Application filed June 28, 1922.  Serial No. 571,570.

*To all whom it may concern:*

Be it known that I, FRANK J. TONE, a citizen of the United States, residing at Niagara Falls, in the county of Niagara and State of New York, have invented a new and useful Improvement in Aluminous Abrasive Materials and Methods of Making the Same, of which the following is a full, clear, and exact description.

My invention relates to the manufacture of aluminous abrasive material by electric furnace treatment, and is designed to produce a new material of this character and also a new method of making the same.

Heretofore artificial aluminous abrasives have been formed into masses, blocks or aggregates by the use of a binder. I have discovered that when abrasive grains of this character are molded into masses or blocks without a binder and these blocks or molded masses are brought up to a sintering temperature or that of incipient fusion, the grains will be united into a solid mass without destroying their individual characteristics. This mass or block may then be used in molded form or may be broken up into fragments for different purposes.

In carrying out my invention in its preferred form, I take grains of artificial aluminous abrasives made, for example, by fusing aluminous material, such as bauxite, in an electric furnace. As is well known, these abrasives do not consist of pure alumina, but also contain a matrix or cementing material consisting of oxides of iron and titanium together with silica, alumina and lime in various proportions. The composition and proportion vary with the quality of the abrasive and methods used in its fusion in the furnace.

I take these artificial aluminous abrasive grains, mold them into blocks or masses, without adding any bonding material, and heat them, preferably in an electric furnace, to a sintering temperature. This temperature, which gives a fluxing of at least a portion of the matrix material to form a bond for the aluminous grains without destroying the individual characteristics of the aluminous grains, will vary with the character of the material; and I have used temperatures varying from 1300° C. up to 1800° C.

Under this sintering action, the grains are welded to each other without destroying their individual characteristics, thus firmly binding them into a solid mass without a bond between the grains. The resulting mass is porous but of great strength.

The masses, blocks, or shapes thus formed may be used as refractory material or for any industrial purpose; or they may be broken or crushed and graded into various sizes of fragments or aggregates. For example, these fragments may be employed in antislip floor surfaces and tread units, as set forth in another application copending herewith.

Many changes may be made in the composition and character of the artificial aluminous abrasive employed, without departing from my invention, since I consider myself the first to sinter and weld together without a bond such aluminous abrasive materials.

I claim:

1. A mass of aluminous abrasive grains united to each other by fluxed portions of their matrix material, the grains retaining their individual characteristics.

2. A mass of aluminous abrasive grains united to each other by fluxed portions of their matrix material and free from added bonding material, the grains retaining their individual characteristics.

3. As a new article of manufacture, crushed or broken fragments composed of aluminous abrasive grains united by fluxed portions of their matrix material, the grains retaining their individual characteristics.

4. The method of making aluminous abrasive material consisting of subjecting aluminous abrasives containing matrix material to a temperature sufficient to flux at least a portion of the matrix material thereof without any substantial dissolving action on the grains, whereby the grains retain their individual characteristics.

5. The method of making aluminous abrasive material, consisting of subjecting aluminous abrasives containing matrix material to a temperature sufficient to flux at least a portion of the matrix material thereof without any substantial dissolving action on the grains, whereby the grains retain their individual characteristics, and then breaking up the mass.

In testimony whereof I have hereunto set my hand.

FRANK J. TONE.